United States Patent
Ohtsuka et al.

(10) Patent No.: US 7,052,187 B2
(45) Date of Patent: *May 30, 2006

(54) OPTICAL CONNECTOR FERRULE, OPTICAL CONNECTOR AND MAKING METHOD FOR THEM

(75) Inventors: Kenichiro Ohtsuka, Yokohama (JP); Yoshikyo Tamekuni, Yokohama (JP); Hiroshi Katsura, Yokohama (JP); Tomohiko Ueda, Yokohama (JP); Toshiaki Kakii, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 273 days.

This patent is subject to a terminal disclaimer.

(21) Appl. No.: 10/084,663

(22) Filed: Feb. 28, 2002

(65) Prior Publication Data

US 2003/0161584 A1 Aug. 28, 2003

(51) Int. Cl.
*G02B 6/38* (2006.01)

(52) U.S. Cl. .......................... 385/60; 385/58

(58) Field of Classification Search ............ 385/53–55, 385/60, 62, 65, 72, 75, 78, 81, 83, 85
See application file for complete search history.

(56) References Cited

U.S. PATENT DOCUMENTS

| | | | | |
|---|---|---|---|---|
| 4,950,048 A | * | 8/1990 | Kakii et al. | 385/83 |
| 4,952,263 A | * | 8/1990 | Kakii et al. | 156/153 |
| 5,557,696 A | * | 9/1996 | Stein | 385/75 |
| 5,815,621 A | * | 9/1998 | Sakai et al. | 385/80 |
| 5,949,937 A | * | 9/1999 | Honjo et al. | 385/59 |
| 6,062,740 A | * | 5/2000 | Ohtsuka et al. | 385/81 |
| 6,146,024 A | | 11/2000 | Melchior | |
| 6,287,017 B1 | | 9/2001 | Katsura et al. | |
| 6,340,247 B1 | * | 1/2002 | Sakurai et al. | 385/78 |
| 6,409,394 B1 | * | 6/2002 | Ueda et al. | 385/80 |
| 6,676,300 B1 | * | 1/2004 | Ohtsuka et al. | 385/78 |

FOREIGN PATENT DOCUMENTS

| | | |
|---|---|---|
| EP | 0 052 014 A2 | 5/1982 |
| EP | 0 241 724 A2 | 10/1987 |
| JP | 63-55507 | 3/1988 |
| JP | 6-278157 | 10/1994 |
| JP | 8-278426 | 10/1996 |
| JP | 9-15453 | 1/1997 |
| JP | 9-68627 | 3/1997 |
| JP | 10-48468 | 2/1998 |
| JP | 10-186175 | 7/1998 |
| JP | 10-188175 | 7/1998 |
| JP | 2001-4862 | 1/2001 |
| JP | 2001-004862 A | 1/2001 |

* cited by examiner

*Primary Examiner*—Phan T. H. Palmer
*Assistant Examiner*—Jennifer Doan
(74) *Attorney, Agent, or Firm*—McDermott Will & Emery LLP

(57) ABSTRACT

A pair of guide holes for guide pin insertion and one or a plurality of optical fiber positioning holes extending inwardly from the front end surface are formed in a connector ferrule of an optical connector. A chamfer is formed on the opening edge portion of the guide hole of the connector ferrule on the front end surface side thereof. The opening diameter R of the guide hole at the front end surface is preferably 1.0 to 1.5 mm when the front end surface is slant polished at an angle of 8 degrees. Furthermore, the chamfering angle θ of the chamfer is preferably 90 to 150 degrees. Moreover, the average particle size of the filler contained in the connector ferrule is no more than 20 μm. As a result, the surface of the chamfer is comparatively smooth.

12 Claims, 10 Drawing Sheets

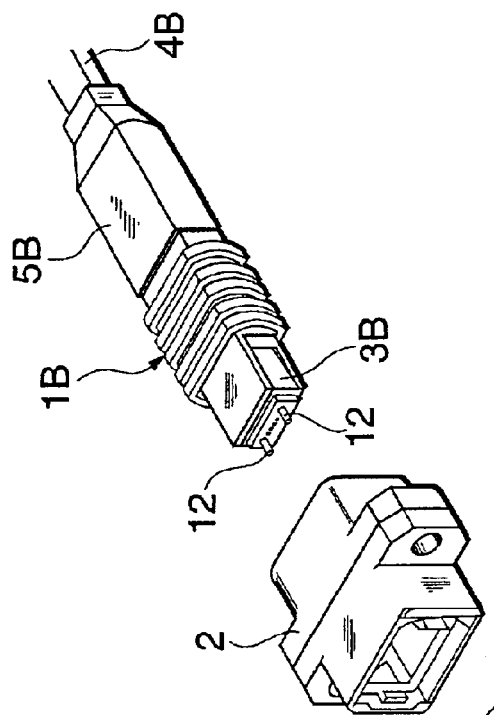
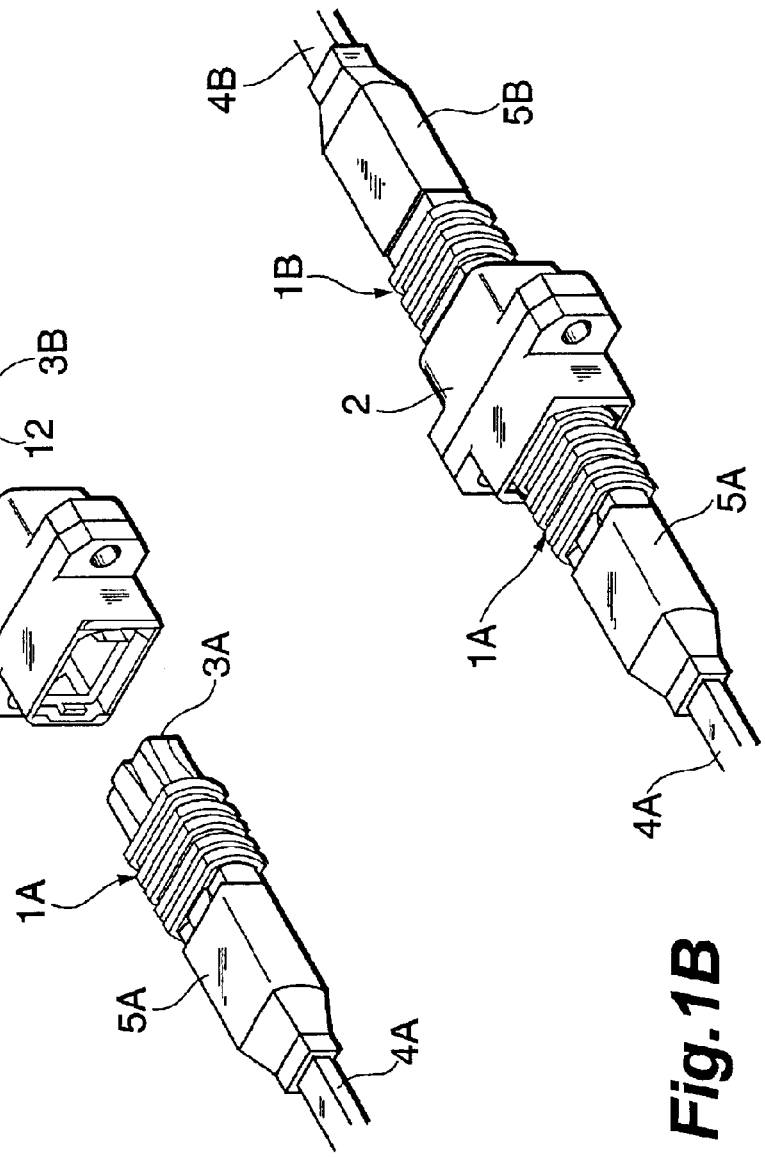
Fig.1A
Fig.1B

OPTICAL CONNECTOR FERRULE, OPTICAL CONNECTOR AND MAKING METHOD FOR THEM

BACKGROUND OF THE INVENTION

1. Field of the Invention

The present invention relates to an optical connector in which single-core or multi-core optical fibers are assembled and secured in a connector ferrule, and to a connector ferrule thereof.

2. Description of the Related Art

In the conventional, well-known optical connectors, for example, as described in JP No. 9-68627A, guide pins are inserted into guide pin holes of a connector ferrule retaining optical fibers and the optical connectors are detachably connected to each other by joining the end surfaces of ferrules to each other.

However, with the above-described conventional technology, when a guide pin is inserted into a guide pin hole of a connector ferrule, the guide pin is brought in contact with the inner wall surface forming the guide pin hole of the connector ferrule, and the respective portion thereof is chipped or bulged. In this case, when optical connectors are connected to each other, a gap can be formed between the optical fibers and optical connection loss can be increased.

SUMMARY OF THE INVENTION

It is an object of the present invention to provide an optical connector and a connector ferrule that can prevent the damage of the connector ferrule when establishing connection of connectors and to reduce the optical connection loss.

The results of intensive research conducted by the inventors demonstrated that ferrules contain a large amount of a filler such as silica for the purpose of improving strength or endurance thereof, but if the particle size of the filler is large, when the guide pin is inserted into the guide hole of the connector ferrule, the guide pin is brought in contact with the inner wall surface forming the guide hole of the connector ferrule, which can easily damage the connector ferrule. This finding led to devise the present invention.

Thus, the connector ferrule for an optical connector in accordance with the present invention has a pair of guide holes for guide pin insertion and one or a plurality of optical fiber positioning holes extending inwardly from the connection end surface, this ferrule comprising a filler with an average particle size of no more than 20 μm and having a chamfer provided at the opening edge portion of the guide holes on the connection end surface side thereof.

Thus, forming a chamfer on the opening edge portion forming a part of a guide hole of the connector ferrule expands the opening of guide holes, thereby facilitating the insertion of guide pins into the guide holes. In this process, the guide pins are sometimes brought in contact with the chamfer surface, but since the average particle size of the filler contained in the connector ferrule is no more than 20 μm, the chamfer surface becomes comparatively smooth, thereby preventing chipping or bulging of the chamfer due to contact with the guide pin. Therefore, the guide pins can be accurately positioned in the guide holes. Furthermore, the amount of abrasion powder produced by friction between the guide pin and the chamfer is also reduced, and the probability of optical fiber damage caused by adhesion of the abrasion powder to the end surface of optical fibers is decreased. As a result, the optical connection loss occurring when the two optical connectors are connected is reduced and the connection/disconnection characteristic of optical connectors is improved. Furthermore, using the filler with an average particle size of no more than 20 μm improves moldability when the chamfer is molded in a die. Moreover, when the chamfer is formed by subsequent processing (drilling), such a filler reduces the drill wear and improves its endurance. Silica is an example of suitable filler.

It is preferred that the maximum particle size of the filler be no more than 40 μm. In such a case, the content of the filler with a large particle size in the filler contained in the connector ferrule is further decreased and the chamfer surface becomes even smoother.

Furthermore, it is preferred that the surface roughness of the chamfer be 0.01 to 2.0 μm. In such a case, the formation of abrasion powder and damage of the chamfer by contact between the guide pin and the chamfer can be effectively reduced, regardless of the method used for forming the chamfer. The surface roughness as referred to herein is a central line average roughness stipulated by JIS or the like.

Moreover, it is also preferred that the diameter of the opening at the connection end surface of a guide hole be larger by 0.3 to 0.8 mm than the diameter of the guide hole inside the connector ferrule. In case the connector ferrule in accordance with the present invention is placed in a housing and an MPO connector (MT Push-on connector) is formed, when the guide pins provided in the mating optical connector are inserted into the guide holes, the guide pins are sometimes displaced from the central axis of guide holes, for example, due to a play of the housing. Even in such a case, the guide pins can be reliably inserted into the guide holes because the opening diameter of guide holes satisfies the above-described condition. It is preferred, that the connection end surface portion be polished at an angle of about 8 degrees.

It is also preferred that the chamfering angle of the chamfer be 90 to 150 degrees. When the optical connector in accordance with the present invention is employed in MPO connectors, in the usual MPO connectors provided with guide pins, the guide pins protrude by about 2 mm from the connection end surface of the connector ferrule. Even with such a configuration, if the chamfering angle of the chamfer satisfies the above-mentioned condition, the guide pins provided on the mating optical connector that are inserted into the guide holes can be retained in the connector ferrule with good stability and positional accuracy. Furthermore, if the chamfering angle of the chamfer is set as described above, a sufficient opening diameter can be guaranteed for the above-described guide holes on the connection end surface.

Moreover, the guide hole comprises a first hole portion with an almost constant diameter approximately equal to that of the guide pin which is to be inserted, and a second hole portion with a diameter larger than that of the first hole portion, this second hole portion being connected to the first hole portion and extending to the end surface side opposite to the connection end surface.

In the connector ferrule with guide holes, the guide holes are sometimes slightly shrunk during ferrule molding. In such a case, when the guide pin is inserted in the guide hole from the connection end surface side, accurate positioning of the guide pin may be impossible because of contact between the rear end of the guide pin and the inner wall surface of the connector ferrule forming the guide hole. Providing the second hole portion in the guide hole makes it possible to avoid the contact between the rear end of the guide pin and the inner wall surface of the connector ferrule forming the guide hole. As a result, the guide pin can be accurately positioned, while being pushed through the first hole portion of the connector ferrule with high stability.

The optical connector in accordance with the present invention is composed of the connector ferrule, optical fibers fixed in the connector ferrule, and a pair of guide pins provided with a curved surface, that has been rounded, at the end portion thereof.

Rounding the tip of guide pin, as mentioned above, further decreases the amount of abrasion powder produced when the guide pin is brought in contact with the chamfer. As a result, the optical connection loss during connection of optical connectors is reduced and the connection/disconnection characteristic of optical connectors is improved.

It is preferred that the guide pin be secured in the connector ferrule in a state in which it is inserted into the guide hole so that the prescribed length of the tip thereof protrudes from the connection end surface. As a result, an optical connector provided with guide pins which has a stable connection/disconnection characteristic can be obtained.

Furthermore, it is also preferred that the length of the guide pin from the base of the curved portion to the tip thereof be no less than 0.1 mm and no more than half of the guide pin diameter. As a result, the amount of abrasion powder produced by friction when the guide pin is brought in contact with the chamfer is further decreased.

BRIEF DESCRIPTION OF THE DRAWINGS

FIGS. 1A and 1B are perspective views illustrating the external appearance of optical connectors which represent the embodiment of the present invention. FIG. 1A illustrates a state prior to connection and FIG. 1B illustrates a state after connection;

FIG. 8 represents experimental data obtained by using a connector ferrule in which no chamfer was provided at the opening edge portion of guide holes;

FIG. 9 represents experimental data obtained by using the connector ferrule in accordance with the present invention;

FIG. 10 represents experimental data obtained by changing the particle size of the filler contained in the connector ferrule;

FIGS. 11 and 12 represent experimental data obtained when the surface roughness of the chamfer was changed.

DESCRIPTION OF THE PREFERRED EMBODIMENTS

Figure 2:
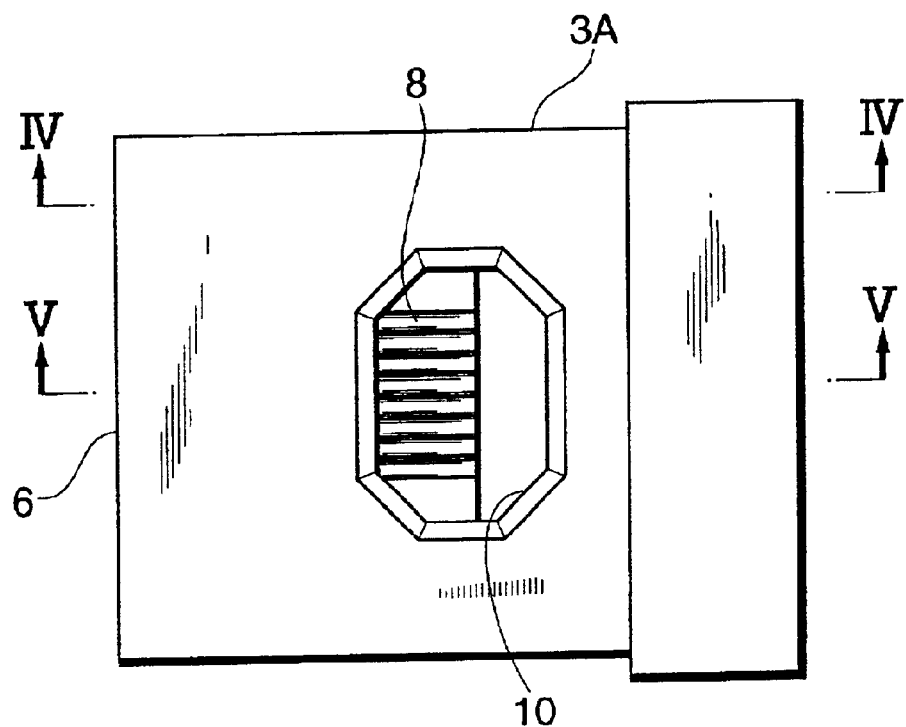
FIG. 2 is a plan view of the connector ferrule of the optical connector without the guide pins, which is shown in FIG. 1.
Figure 3:
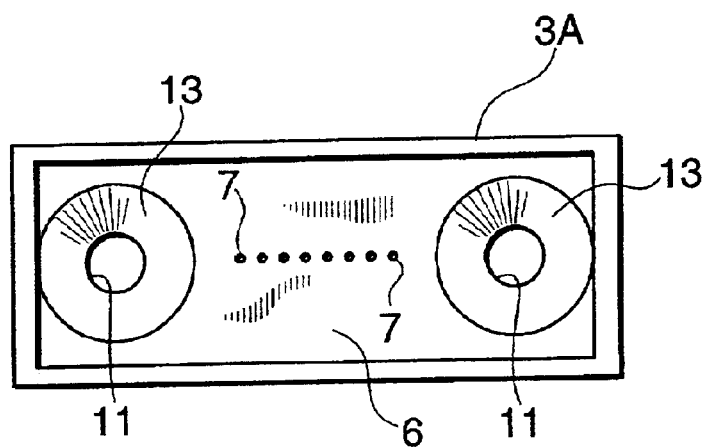
FIG. 3 is a front view thereof.

The preferred embodiment of the present invention will be described below with reference to the appended figures. To facilitate the comprehension of the explanation, the same reference numerals denote the same parts, where possible, throughout the drawings, and a repeated explanation will be omitted.

FIGS. 1A and 1B are perspective views illustrating the external appearance of optical connectors of the present embodiment. FIG. 1A illustrates a state prior to connection of the optical connectors and FIG. 1B illustrates a state after the connection of optical connectors.

As shown in the figures, optical connectors 1A, 1B are both the MPO connectors. Among them, the optical connector 1A is assembled as a connector without guide pins and the optical connector 1B is assembled as a connector with guide pins. Such optical connectors 1A, 1B are detachably connected via an adapter 2.

The optical connector 1A has a connector ferrule 3A. An optical fiber ribbon 4A of a single-core or multi-core (eight cores in this embodiment) is assembled with the connector ferrule 3A. The optical connector 1B has a connector ferrule 3B. An optical fiber ribbon 4B with the number of cores equal to that of the optical fiber ribbon 4A is assembled with the connector ferrule 3B. The connector ferrules 3A, 3B are enclosed in housings 5A, 5B, respectively.

The connector ferrules 3A, 3B are formed by adding silica, which serves as a filler, for example, to PPS (polyphenylene sulfide), which is a plastic, for the purpose of increasing strength and endurance. The mixing ratio (weight ratio) of those substances is, for example, as follows: PPS 30%, silica 70%. A specific configuration of ferrule 3A is shown in FIGS. 2 to 5.

As shown in those figures, connector ferrule 3A has eight optical fiber positioning holes 7 extending inward from the connection end surface (front end surface) 6 which is to be connected to the mating optical connector 1B. The fiber ribbon enclosure holes 9 are connected to the optical fiber positioning holes 7 via optical fiber positioning grooves 8. When the optical fiber ribbon 4A is assembled with such a connector ferrule 3A, the fiber ribbon 4A is inserted into the fiber ribbon enclosure hole 9 from the rear end surface of ferrule 3A, and eight optical fibers exposed from the front end of fiber ribbon 4A are inserted into the optical fiber positioning holes 7. The optical fiber is fixed in the connector ferrule 3A by filling an adhesive from the opening 10 formed in the upper surface of ferrule 3A. After the fiber ribbon 4A has thus been assembled with the connector ferrule 3A, the front end surface 6 of ferrule 3A is slant polished at an angle of 8 degrees (see a two-dot line in FIG. 4 and FIG. 5). As a result, the effect of reflected and returned light produced by Fresnel reflection in the connected state is reduced.

A pair of guide holes 11 extending inwardly parallel to the optical fiber positioning holes 7 from the front end surface 6 of connector ferrule 3A are formed on both sides of the optical fiber positioning holes 7, and guide pins 12 (described hereinbelow) provided in the optical connector 1B are inserted into the guide holes 11.

Figure 6:
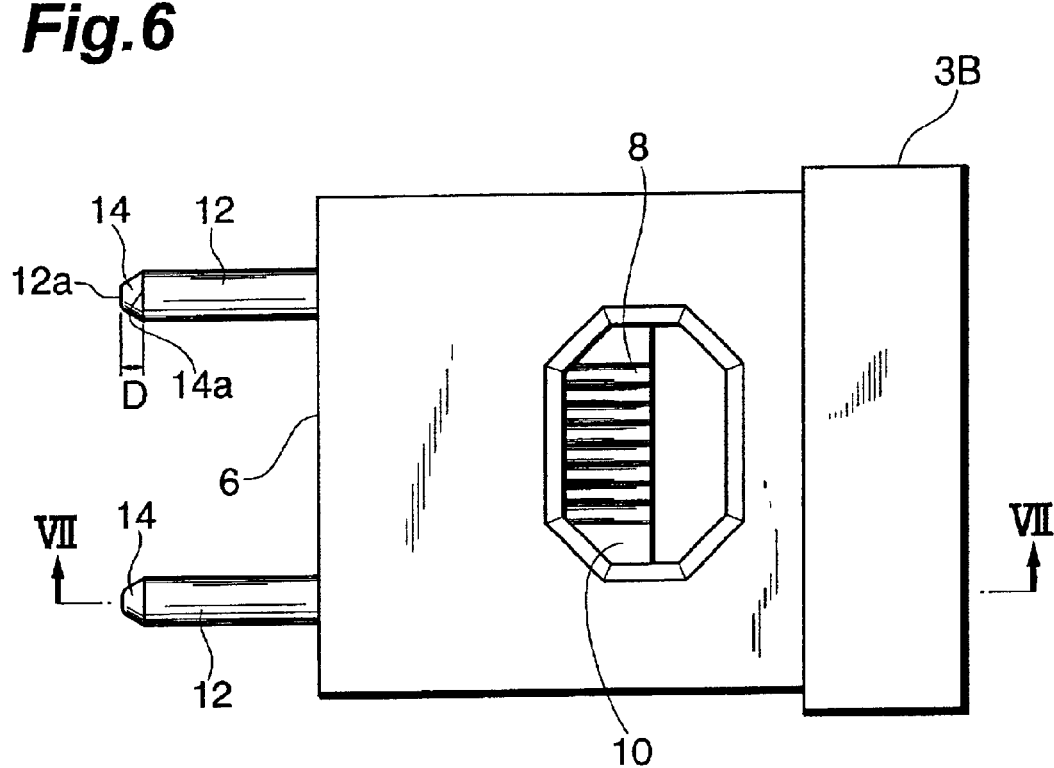
FIG. 6 is a plan view of the connector ferrule of the optical connector with the guide pins, which is shown in FIG. 1.
Figure 7:
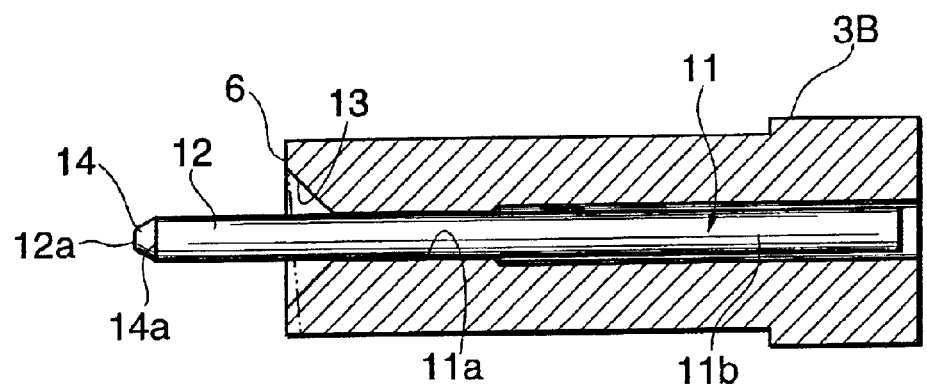
FIG. 7 is a sectional view thereof along VII—VII line.

The connector ferrule 3B of optical connector 1B, as shown in FIG. 6 and FIG. 7, has a structure similar to that of connector ferrule 3A of optical connector 1A described above, and the guide pins 12 are inserted and secured in the guide holes 11 of connector ferrule 3B. At this time, the guide pins 12 are secured in the connector ferrule 3B in a state in which they are inserted into the guide holes 11 so that the tips thereof protrude by about 2 mm from the front end surface 6.

A chamfer 13 is formed on the opening edge portion of the front end surface 6 of connector ferrules 3A and 3B forming a part of such guide holes 11, and the opening of guide hole 11 expands on the front end surface 6.

The configuration is preferably such that the diameter R of the opening at the front end surface 6 of guide hole 11 is 1.0 to 1.5 mm when the front end surface 6 is slant polished (described above) at an angle of 8 degrees (see FIG. 4). The configuration of MPO connector is such, as described above, that the connector ferrule is enclosed in the housing. Therefore, when the guide pins 12 of optical connector 1B are inserted into the guide holes 11 for the purpose of connector connection, the central axis of guide pin 12 is sometimes displaced with respect to the central axis of guide hole 11, for example, because of a play of the housing 5. This displacement is apparently about 0.15–0.4 mm. Therefore, it is necessary to provide the amount of chamfering on both sides of the guide hole 11 which will at least correspond to this displacement. On the other hand, because the diameter of guide pin 12 is determined as about 0.7 mm, the diameter of guide pin 11 is also almost about 0.7 mm. With the foregoing in view, it is preferred that the diameter R of the opening at the front end surface 6 of guide hole 11 be within the above-described range, in other words, that it be set by 0.3 to 0.8 mm larger than the diameter of guide hole.

Figure 4:
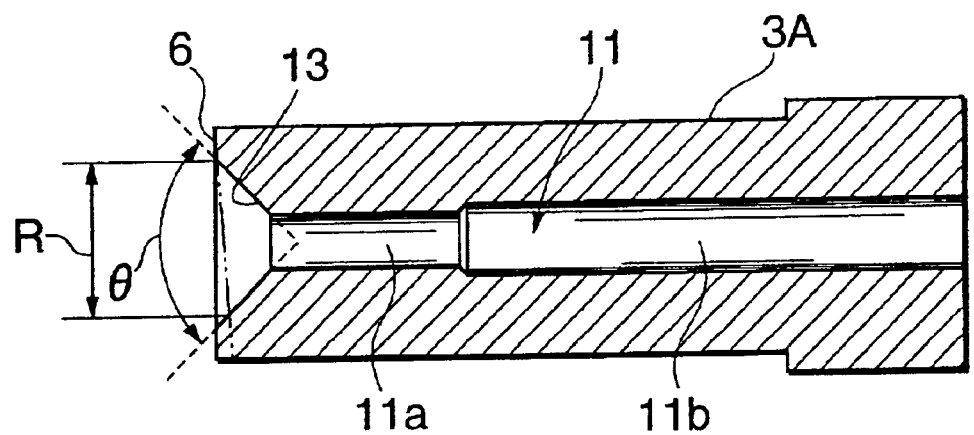
FIG. 4 is a sectional view along IV—IV line in FIG. 2.
Figure 5:
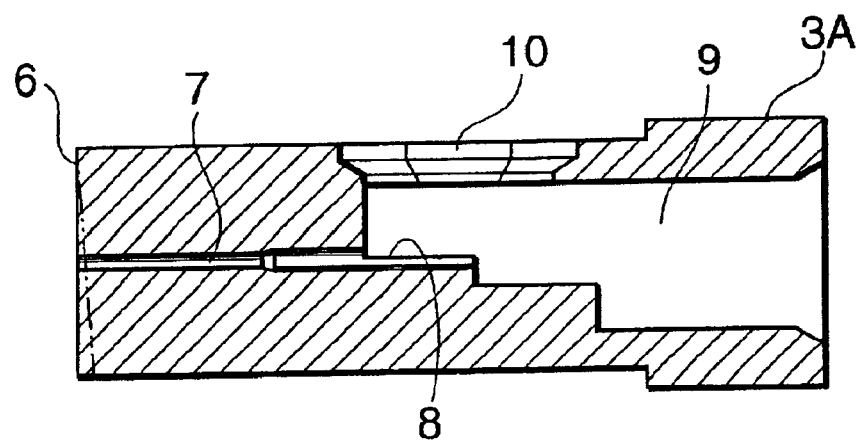
FIG. 5 is a sectional view along V—V line in FIG. 2.

Furthermore, the chamfering angle θ of chamfer 13 is preferably 90 to 150 degrees (see FIG. 4). As described above, the guide pin 12 of optical connector 1 protrudes by about 2 mm from the front end surface 6 of ferrule 3B. When such a guide pin 12 is inserted into the guide hole 11 of connector ferrule 3A, in order to position the guide pin 12 accurately and with high stability, it is necessary that at least 1 mm of the tip of guide pin 12 be inserted into the guide hole 11 and positioned therein. At this time, it is also necessary to provide the above-described opening diameter R of guide hole 11. It is preferred that the chamfering angle θ of chamfer 13 be thereby fit into the aforesaid range.

However, the guide hole forming the connector ferrule is sometimes shrunk and slightly curved during ferrule molding. At this time, in case the diameter of guide hole is constant through its entire length, for example, when the guide pins are inserted from the front end surface into the guide holes of connector ferrule for the purpose of making an optical connector provided with guide pins, the rear end (base end) of the guide pin interferes with the inner wall surface of connector ferrule forming the guide hole, and there is a possibility that the guide pin will not be accurately positioned in the respective position. Furthermore, if the guide pin is made shorter to avoid this abnormality, the portion of the guide pin that is inserted into the guide hole becomes respectively shorter and the guide pin can become unstable.

To resolve this problem the guide holes 11 of ferrules 3A, 3B are composed of a first hole portion 11a with a diameter almost equal to that of guide pin 12 and a second hole portion 11b with a diameter slightly larger than the diameter of the first hole portion 11a, this second hole portion being formed at the rear end surface side of connector ferrules 3A, 3B with respect to the first hole portion 11a. As a result, even in case the guide hole 11 is shrunk, the contact between the rear end of guide pin 12 and the inner wall surface of connector ferrule 3B forming the guide pin 12 will be avoided, when the guide pin 12 is inserted from the front end surface 6 into the guide hole 11 of connector ferrule 3B for the purpose of fabricating the optical connector 1B, for example (FIG. 7). At this time, since the bending tool of guide hole 11 subjected to shrinking during molding is apparently about 2 to 3 μm, the interference of guide pin 12 can be effectively avoided if the opening diameter of the second hole portion 11b is by no less than 5 μm larger than the opening diameter of the first hole portion 11a. Therefore, the guide pin 12 can be reliably positioned, while maintaining the guide pin 12 with good stability only in the first hole portion 11a of ferrule 3B.

In the connector ferrules 3A and 3B of such a configuration, because the chamfer 13 is provided at the opening edge of the front end surface 6 forming a part of guide hole 11, when the optical connectors 1A and 1B are connected, the guide pin 12 fixed in the connector ferrule 3B is easily inserted into the guide hole 11 of connector ferrule 3A.

The chamfer 13 can be formed simultaneously with the formation of ferrule body by using a die described in U.S. Pat. No. 6,287,017 during die molding of connector ferrule 3B. It may also be formed by cutting the opening edge with a drill or grinding stone after the optical connector has been molded.

However, if the particle size of the filler (the above-mentioned silica) contained in connector ferrule 3A and 3B is large, the surface of chamfer 13 becomes rough, regardless of the method employed for forming the chamfer 13 (molding of subsequent processing such as drilling), and when the guide pin 12 is brought in contact with the chamfer 13, the surface of chamfer 13 is easily chipped or bulged. If the chamfer 13 is thus chipped or bulged, the guide pin 12 is difficult to position accurately in the guide hole 11. Furthermore, an abrasion powder or dust are formed when the guide pin 12 is brought in contact with the chamfer 13, and this powder or dust not only damages the chamfer 13, but also can adhere to the end surface of optical fiber and damage the optical fiber. Moreover, when the optical connectors 1A and 1B are connected with a PC (Physical Contact), the PC connection can be interrupted by the bulging on chamfer 13. The above-described deficiencies eventually lead to the increase in optical connection loss when the optical connectors 1A and 1B are connected.

In the present embodiment, the average particle size of the filler contained in connector ferrules 3A and 3B is no more than 20 μm. Furthermore, the maximum particle size of the filler is no more than 40 μm. As a result, the entire surface of chamfer 13 is comparatively smooth. It is preferred that the surface roughness Ra of chamfer 13 be 0.01 to 2.0 μm. The surface roughness as referred to herein is a central line average roughness stipulated by JIS or the like. More specifically, this is the value obtained by finding a roughness curve, bending it over the central line and dividing the surface area of the zone above the central line by the measurement length. As a result, when the guide pin 12 secured in the connector ferrule 3B is inserted into the guide hole 11 of connector ferrule 3A, chipping or bulging of the surface of chamfer 13 caused by the contact between the guide pin 12 and chamfer 13 is suppressed. Therefore, the guide pin 12 can be accurately positioned in the guide hole 11. Furthermore, since the formation of abrasion powder caused by friction of the guide pin 12 and chamfer 13 is reduced, the damage of optical fibers is also suppressed. As a consequence, the optical connection loss during connection of optical connectors 1A and 1B is decreased and a stable connection/disconnection characteristic of optical connectors 1A and 1B is obtained.

Furthermore, if the particle size of the filler is decreased, moldability during die molding of chamfer 13 is improved. Furthermore, when the chamfer 13 is formed by subsequent processing (drilling), the wear loss of the drill is effectively reduced and drill endurance is improved.

Experimental data relating to optical connection loss during connection of two optical connectors are shown in FIGS. 8 to 12.

Figure 8:
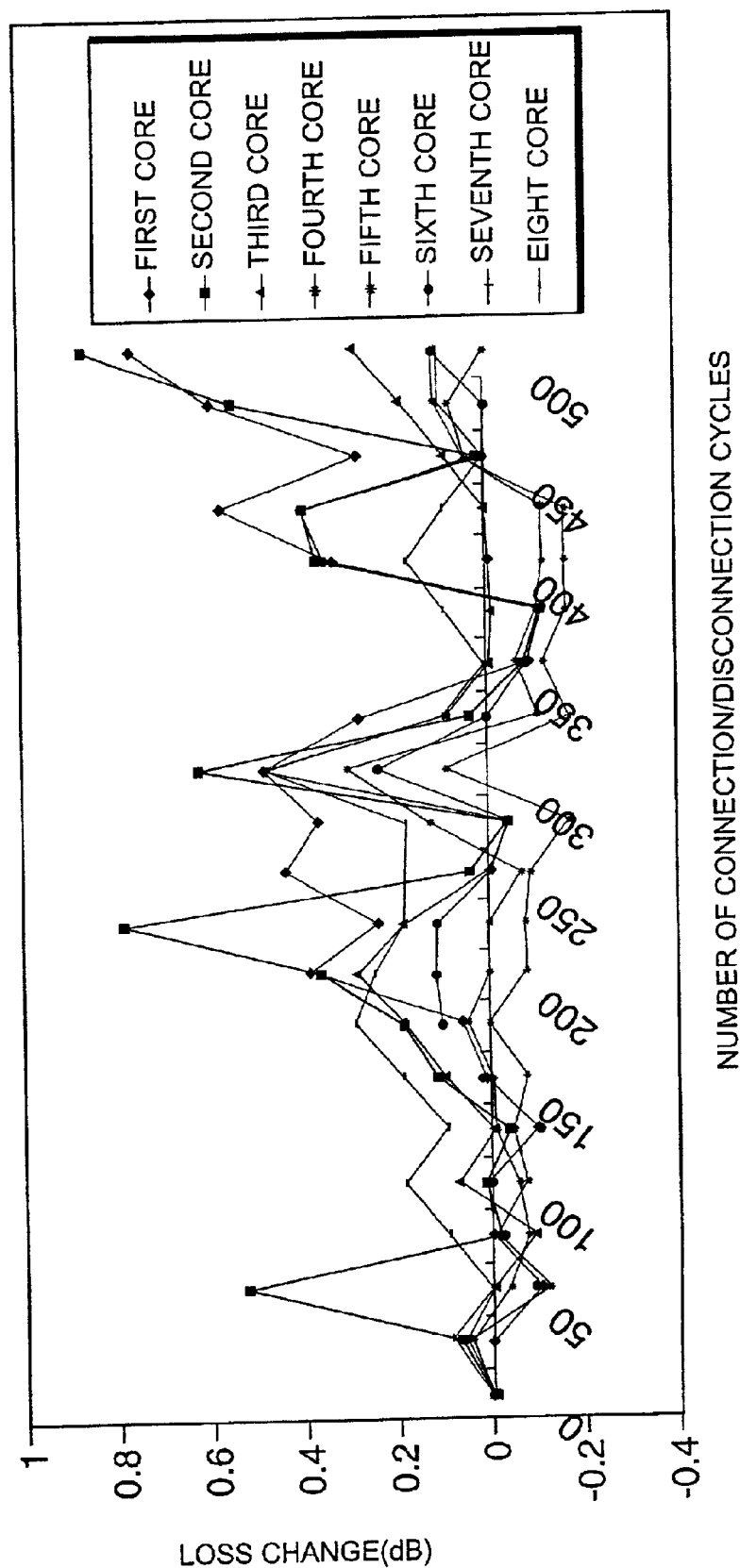
FIGS. 8, 9, 10, 11 and 12 represent experimental data illustrating the optical connection loss in optical connectors.

FIG. 8 represents experimental data obtained by using a connector ferrule in which no chamfer was provided at the opening edge forming a portion of guide hole. The filler contained in the connector ferrule is silica with an average particle size of no more than 20 µm. In the figure, the number of connection/disconnection cycles of optical connectors is plotted against the abscissa, and the loss increment is plotted against the ordinate. FIG. 8 clearly shows that, independently of the number of connection/disconnection cycles of optical connectors, the loss increment sometimes rapidly rises and the connection/disconnection characteristic of optical connectors is unstable.

Figure 9:
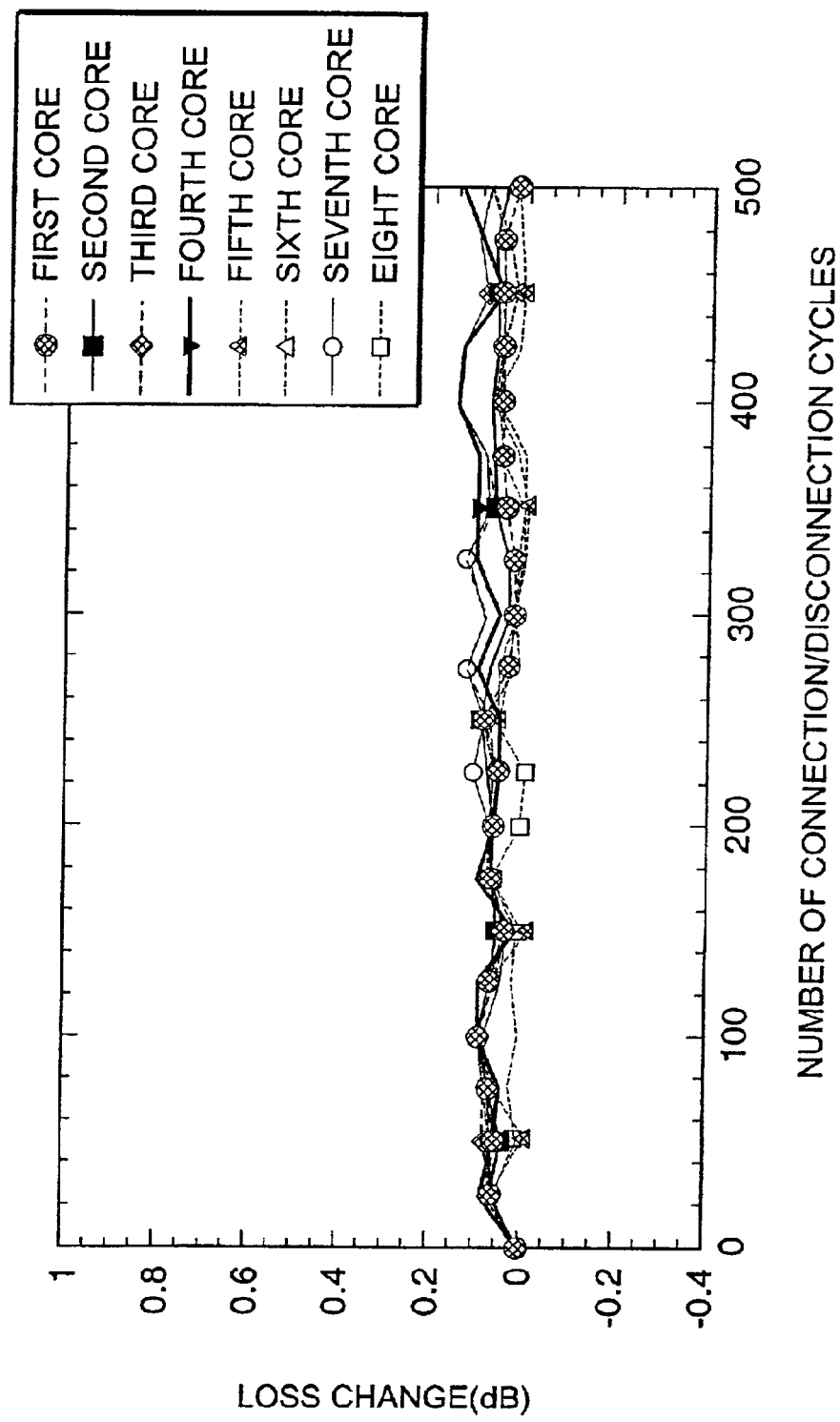

FIG. 9 represents experimental data obtained by using the connector ferrule in accordance with the present invention, that is, the connector ferrule provided with a chamfer at the opening edge forming a portion of guide hole. The filler contained in the connector ferrule is silica with an average particle size of no more than 20 µm. In this case, independently of the number of connection and disconnection cycles of optical connectors, the loss increment is small and the connection/disconnection characteristic of optical connectors is stabilized.

Experimental data shown in FIG. 8 and FIG. 9 demonstrate that the connection loss of optical fibers can be effectively reduced not only by decreasing the particle size of the filler contained in connector ferrules 3A, 3B, but also by providing the chamfers 13 at the opening edges of front end surfaces 6 forming a portion of guide holes 11 of connector ferrules 3A and 3B.

Figure 10:
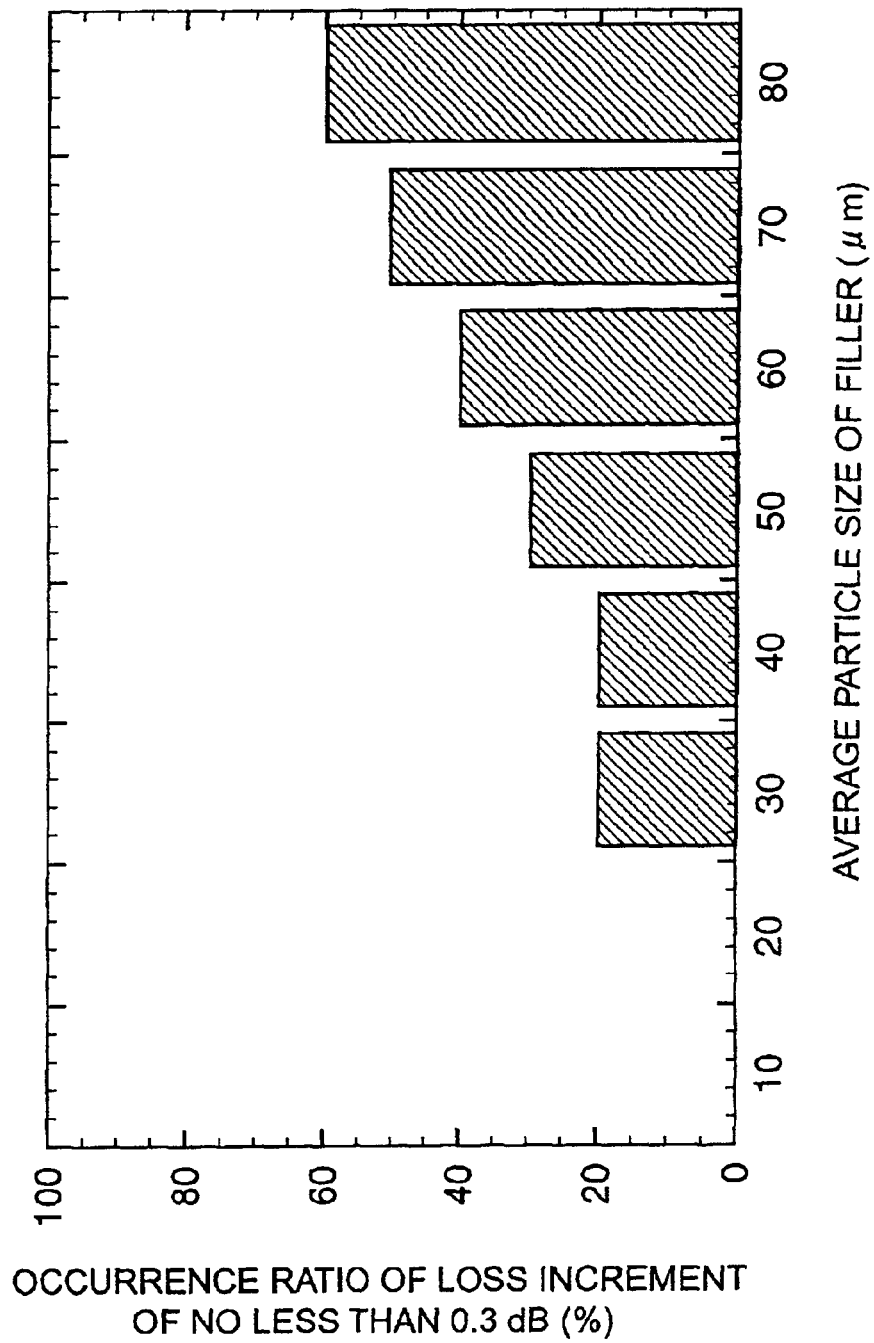

FIG. 10 represents experimental data on optical connection loss obtained by changing the particle size of the filler (silica) contained in the connector ferrule provided with a chamfer at the opening edge portion forming a part of guide hole. In this figure, the average value of the particle size of the filler is plotted against the abscissa, and the occurrence ratio of loss increment of no less than 0.3 dB is plotted against the ordinate. FIG. 10 shows that when the average particle size of the filler is no more than 20 µm, the occurrence ratio of loss increment of no less than 0.3 dB is zero. Therefore, it is clear that the effective average particle size of the filler is no more than 20 µm.

Figure 11:
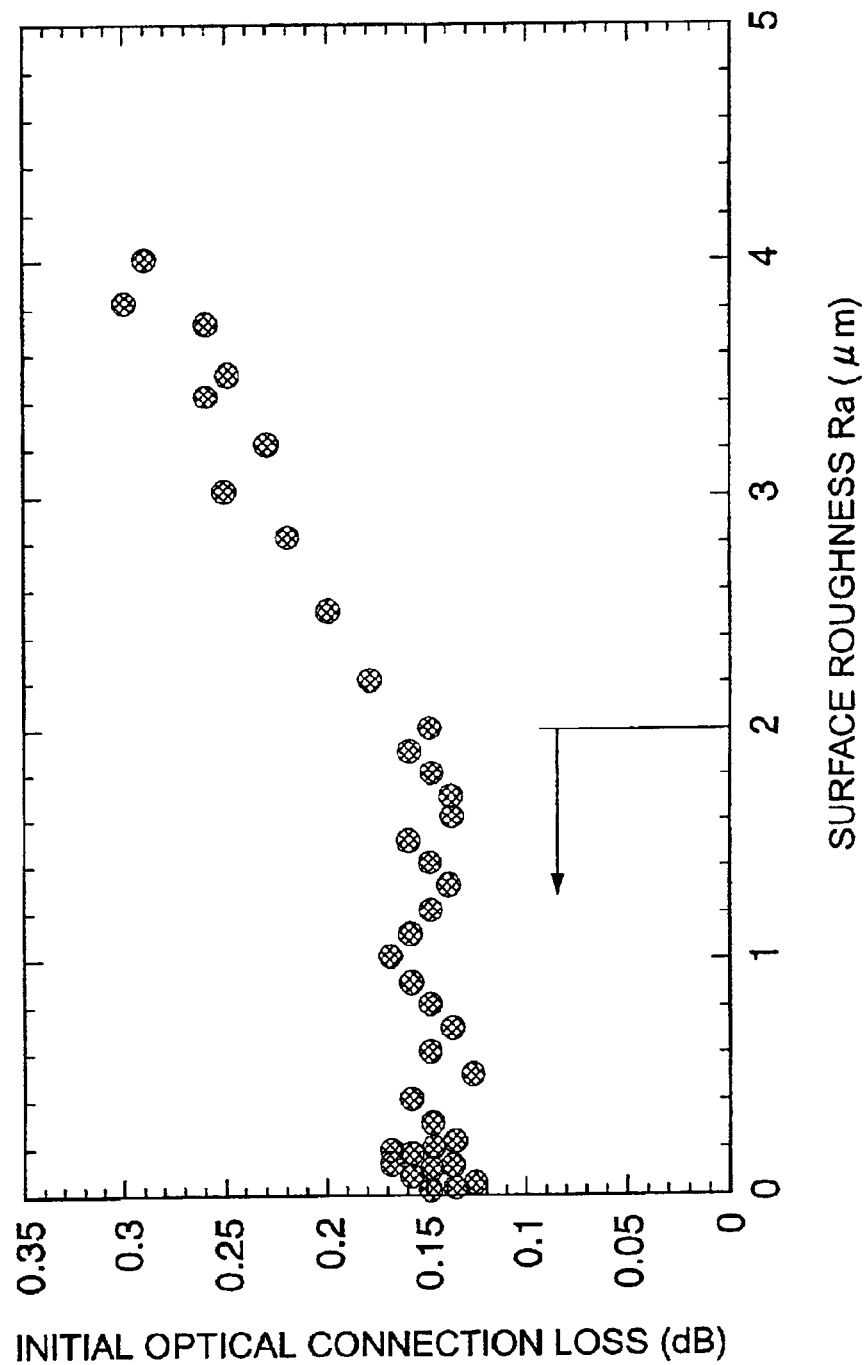

FIG. 11 represents experimental data on optical connection loss obtained by changing the surface roughness Ra of the chamfer in the connector ferrule provided with a chamfer at the opening edge portion forming a part of guide hole. In this figure, the surface roughness Ra of the chamfer is plotted against the abscissa, and the initial optical connection loss is plotted against the ordinate. FIG. 11 clearly shows that the initial loss is close to 0.15 dB and is comparatively stable when the surface roughness Ra of the chamfer is no more than 2 µm.

Figure 12:
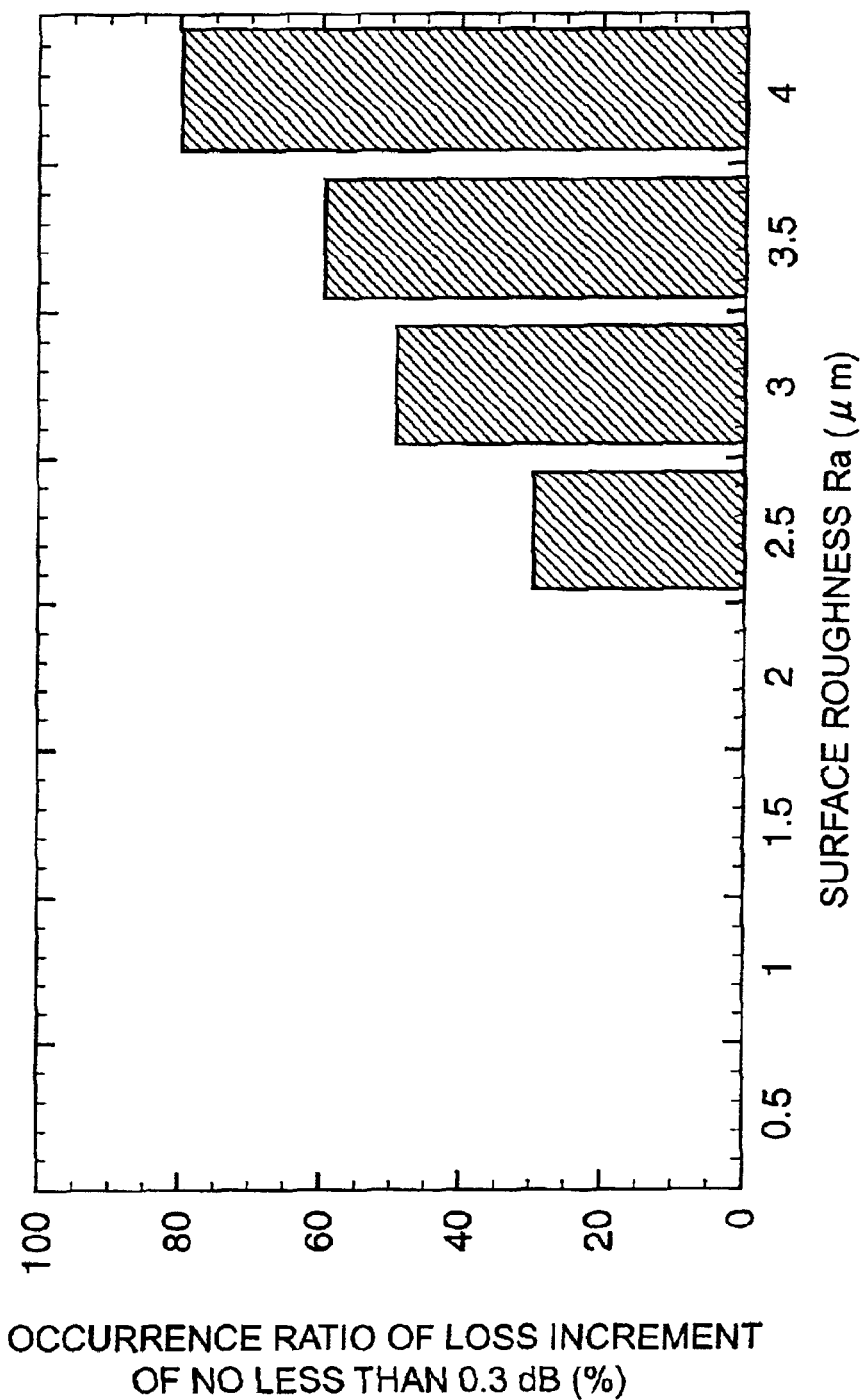

FIG. 12 represents experimental data on optical connection loss obtained by changing the surface roughness Ra of the chamfer in the connector ferrule provided with a chamfer at the opening edge portion forming a part of a guide hole. In this figure, the surface roughness Ra of the chamfer is plotted against the abscissa, and the occurrence ratio of loss increment of no less than 0.3 dB is plotted against the ordinate. FIG. 12 clearly shows that the occurrence ratio of loss increment of no less than 0.3 dB is zero when the surface roughness Ra of the chamfer is no more than 2 µm.

Experimental data presented in FIG. 11 and FIG. 12 show that when the chamfer 13 is provided at the opening edge forming a part of guide hole 11 of connector ferrules 3A and 3B, it is preferred than the connector ferrules 3A and 3b be formed so that the surface roughness Ra of chamfer 13 be no more than 2 µm.

In the optical connectors 1A and 1B thus constructed, a curved portion 14, that has been rounded, is provided at the tip of guide pin 12 fixed in ferrule 3B (see FIG. 6 and FIG. 7). If the diameter of guide pin 12 is assumed to be about 0.7 mm, then it is preferred that the length D from the base 14a of curved portion 14 to the tip 12a of guide pin 12 be no less than 0.1 mm and no more than half of the diameter of guide pin 12, that is, no more than 0.35 mm, so that the curved portion 14 itself reaches the tip and forms a semispherical portion. If the curved portion 14 is thus formed at the tip of guide pin 12, when the guide pin 12 fixed in the connector ferrule 3B is inserted into the guide hole 11 of connector ferrule 3A, the amount of abrasion powder formed because of contact between the guide pin 12 and chamfer 13 is further decreased. Therefore, a more stable optical connection characteristic can be obtained.

Furthermore, the present invention is not limited to the above-described preferred embodiment. For example, the optical connectors of the above-described embodiment were MPO connectors, but the present invention is not limited thereto and can be also applied to MT connectors and the like.

Figure 13:
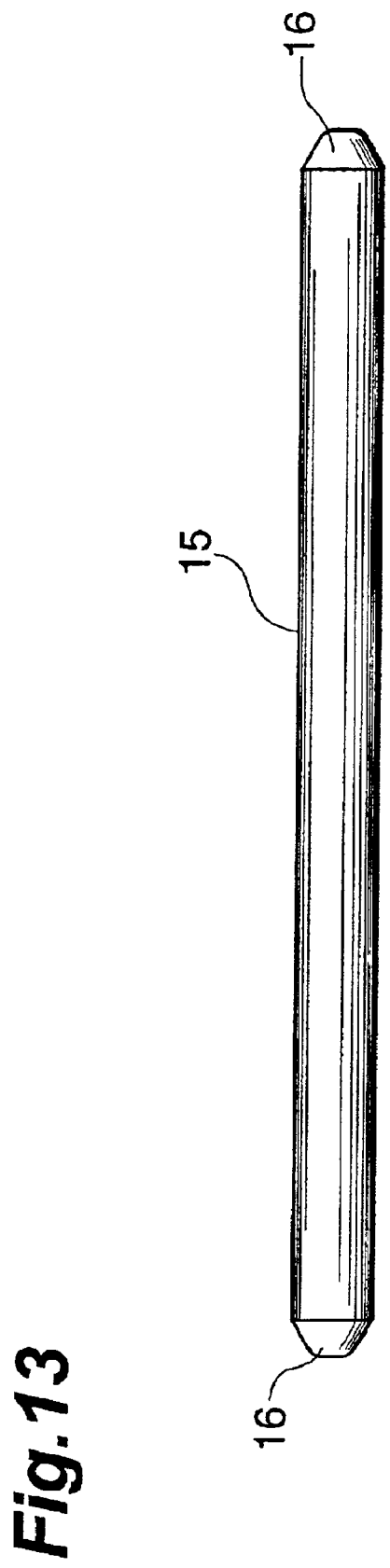
FIG. 13 illustrates an example of a guide pin used FOR connecting optical connectors without the guide pins, which are shown in FIG. 1.

Moreover, in the above-described embodiment, coupling of the optical connector provided with guide pins and the optical connector with no guide pins was considered. The present invention is, however, not limited to such a configuration and is also applicable to a connection in which two optical connectors with no guide pins are coupled by using two guide pins. In such a case, as shown in FIG. 13, the guide pins 15 are preferably provided on both ends thereof with curved portions 16 rounded similarly to the above-described guide pin 12.

Furthermore, in the above-described embodiment, silica was used as a filler added to the resin for molding the connector ferrules 3A and 3B. However, the present invention is not limited to silica as a filler, and similar fillers of various types can be used.

What is claimed is:

1. A connector ferrule for an optical connector with a pair of guide holes for guide pin insertion and on or a plurality of optical fiber positioning holes extending inwardly from the connection end surface, wherein said connector involves a filler with an average particle size of no more than 40 µm and having a chamfer provided at the opening edge portion of said guide holes on the connection end surface side thereof;

the maximum particle size of said filler is no more than 20 µm; and a surface roughness of said chamfer is 0.01 to 2.0 µm.

2. The connector ferrule according to claim 1, wherein the opening diameter of said guide hole at said connection end surface is formed to be larger by 0.3 to 0.8 mm than the diameter of said guide hole inside the connector ferrule.

3. The connector ferrule according to claim 1, wherein the chamfering angle of said chamfer is 90 to 150 degrees.

4. The connector ferrule according to claim 1, wherein said guide hole comprises a first hole portion with a substantially constant diameter connected to said chamfer and extending inside the connector ferrule and a second hole portion connected to said first hole portion, extending to the end surface side opposite to said connection end surface and having a diameter larger than that of said first hole portion.

5. The connector ferrule according to claim 1, wherein said filler is silica.

6. An optical connector comprising:
a connector ferrule according to claim 1;
an optical fiber inserted and secured inside the optical fiber positioning hole of said ferrule; and
a pair of guide pins provided with a curved portion, that has been rounded, at the end thereof.

7. The optical connector according to claim 6, wherein said guide pin is inserted and fixed in said guide hole in a state in which the tip thereof protrudes from said connection end surface by a prescribed length.

8. The optical connector according to claim 6, wherein the length from the base of the curved portion of said guide pin to the tip of said guide pin is no less than 0.1 mm and no more than half of the diameter of said guide pin.

9. A making method for a connector ferrule for an optical connector comprising guide holes for inserting a pair of guide pins and optical fiber positioning holes extending inward from the connection end surface, by filling the inside of a die with a resin and curing the resin, wherein
said resin comprises a filler with average particle size of no more than 40 μm;
a chamfer is formed at the end portion of the guide hole of the connector ferrule at the connection end surface side by die molding or subsequent processing after molding;
the maximum particle size of said filler is no more than 20 μm; and
the surface roughness of said chamfer of said ferrule is adjusted to 0.01 to 2.0 μm by adjusting the particle size distribution of said filler.

10. The making method for connector ferrule according to claim 9, wherein the guide hole diameter on the side opposite to the connection end surface is made larger than the guide hole diameter on the connection end surface during die molding or after molding.

11. The making method for a connector ferrule according to claim 9, wherein said filler is silica.

12. The making method for an optical connector comprising the step of:
preparing the connector ferrule according to claim 1 and a pair of guide pins provided with a curved portion, that has been rounded, at the end thereof;
inserting and fixing optical fibers in optical fiber positioning holes of said ferrule; and
inserting said guide pins in guide holes of said ferrule and fixing said pins in a state in which the tip thereof protrudes by the prescribed length from the connection end surface of the connector ferrule.

* * * * *